June 25, 1957 P. J. SMITH 2,797,391
WAVE PROPAGATION MODE CONVERTER
Filed Jan. 30, 1952
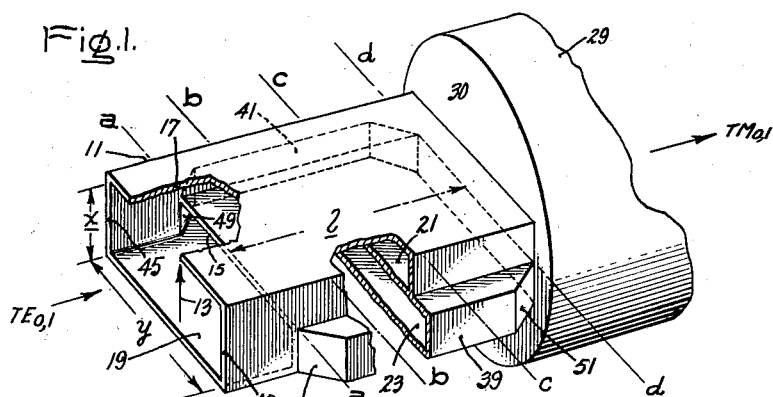
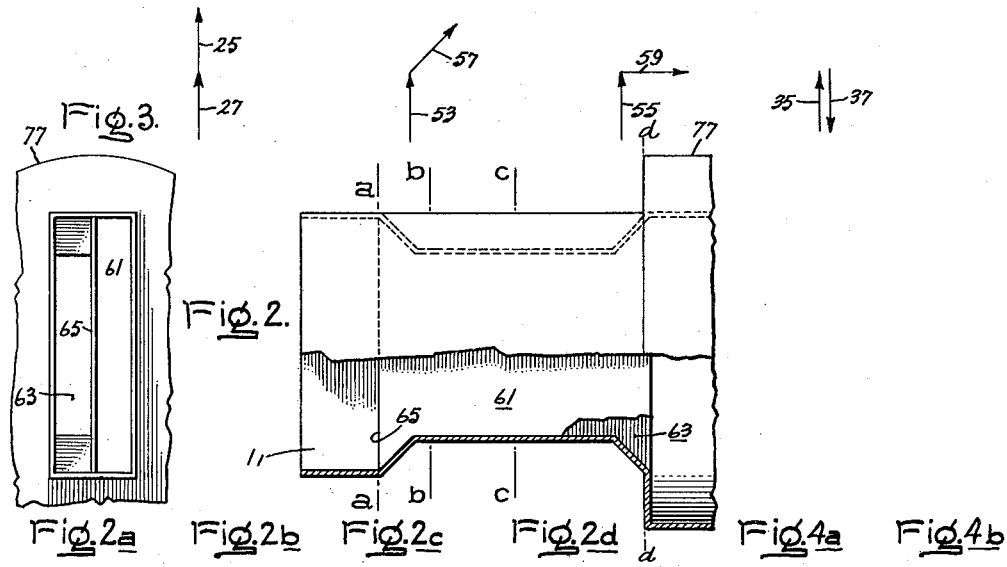
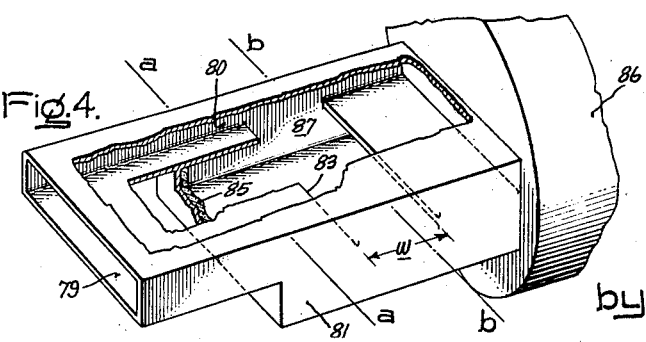
Inventor:
Philip J. Smith,
by Merton D. Morse
His Attorney.

United States Patent Office 2,797,391
Patented June 25, 1957

2,797,391

WAVE PROPAGATION MODE CONVERTER

Philip J. Smith, North Syracuse, N. Y., assignor to General Electric Company, a corporation of New York Application January 30, 1952, Serial No. 269,080

7 Claims. (Cl. 333—21)

My invention relates to ultra-high-frequency wave energy transmission systems, and more particularly to wave guide apparatus employed in such systems for converting one mode of wave energy transmission to another.

Heretofore, there have been described various types of mode converters for converting guided waves from the $TE_{0,1}$ mode in a rectangular wave guide to the dominant or higher modes in a circular wave guide, for the purpose of providing an efficient mode of transmission through rotatable coupling arrangements employed, as for example, in microwave communication systems.

The prior-known arrangements, however, commonly require right-angle or other sharp bends at the junction of the rectangular and circular wave guide sections and such bends, as is well known, introduce undesired reflection of the transmitted energy and result in attenuation and losses of energy. Angled transition sections also cause excitation of higher transmission modes, which required the use of mode suppressors or the like to eliminate such higher modes in applications where purity of the lowest or dominant mode is required. Thus, such right-angle bends add to the complexity of construction, and thereby increase the cost of manufacture and maintenance of the equipment.

It is, accordingly, an object of the present invention to provide a mode converter apparatus for use with guided wave energy that provides straight-through converter sections, which substantially eliminate the undesirable features of the prior-known devices.

Another object is to provide apparatus for converting a $TE_{0,1}$ mode in a rectangular wave guide to a circularly symmetrical mode as, for example, a $TM_{0,1}$ mode in a wave guide of circular cross section.

A further object of my invention is to provide novel improved converter sections that are relatively simple in construction, economical to produce and, which have small losses.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which Fig. 1 is an isometric view, with parts broken away, of mode converter apparatus embodying the features of my invention; Figs. 1a through 1d are vector representations of the electric field at various points along the axis of the apparatus of Fig. 2; Fig. 2 is a plan view, with parts broken away, of a modification of my invention; Figs. 2a through 2d are vector representations of the electric field at various points in the apparatus of Fig. 2; Fig. 3 is an end view of the apparatus of Fig. 2; Fig. 4 is an isometric view, with parts broken away, of a further modification of my invention; and Figs. 4a and 4b are vector representations of the electric field at various points in the apparatus of Fig. 4.

Referring now to the drawing, and particularly Fig. 1 thereof, I have shown a section of hollow rectangular wave guide 11 of relatively narrow and wide transverse dimensions $x$ and $y$ respectively, suitably proportioned to transmit ultra-high-frequency electromagnetic energy in the dominant $TE_{0,1}$ mode in relatively pure form free from higher transmission modes. The electric field of the waves in the wave guide section 11, as indicated by the vector 13, is linear and perpendicular to the $y$-dimension, as is well known.

A conductive septum 15 is supported within the wave guide section 11 and extends axially from a transverse plane indicated by the line $a$—$a$ along the entire remaining length of the guide 11. The plane of the septum 15 is preferably parallel to the $y$-dimension of the guide 11 and is disposed midway between upper and lower guide walls 17, 19 so as to divide the wave guide section 11 into upper and lower wave guide sections 21, 23 between which the energy propagated in the guide 11 splits in substantially equal portions.

The electric fields of the waves entering the upper and lower wave guide sections 21, 23, for the indicated $TE_{0,1}$ mode, are also linear and oriented parallel to each other and to the electric field of the waves in the section 11, as indicated in Fig. 1a, wherein the vector 25 represents the electric field of the waves in the lower section 23 and the vector 27, colinear therewith, represents the electric field of the waves in the upper section 21, the fields of each section being taken in plane normal to the axes of the wave guide sections 21, 23 at the line $a$—$a$.

For launching electromagnetic waves in the dominant $TM_{0,1}$ mode in a cylindrical wave guide 29, connected directly to the rectangular wave guide sections 21, 23 and suitably dimensioned to support this mode, the divided wave energies, after traversing the length of the wave guide sections 21, 23, should be in anti-phase relation, as indicated in Fig. 1d, in which the directions of the electric fields of the waves from the upper and lower sections 21 and 23 are represented by anti-parallel vectors 35 and 37, respectively. The connection of the circular guide 29 to the divided rectangular guides 21, 23, may be in any suitable conventional manner, as by soldering or brazing the rectangular guides into a suitable opening in an end wall 30 of the guide 29.

The desired anti-parallel orientation of the electric fields can be obtained by increasing or decreasing the phase velocity of the waves in one of the sections 21 or 23 so as to shift the phase thereof by 180°. To this end, the wide transverse dimension of one of the sections, here shown as section 23, is increased, thereby decreasing the phase velocity and the wavelength, within the guide, of the waves propagated therein.

Thus, as shown in Fig. 1, laterally offset side walls 39, 41 are provided, which define, with bottom wall 19 and septum 15, a wave guide 23 of increased wide dimension with respect to the dimension $y$. For providing matched impedances between the wave guide sections 11 and 23, the walls 39, 41 are connected to side walls 43, 45 of the guide 11 by means of outwardly sloping wall members 47, 49, which define tapered transition sections. Such transition sections, as is well kown, operate to match the impedances of the interconnected wave guide sections. A similar impedance-matching tapered transition section 51 is desirable to bring the expanded wave guide section 23 to the original starting wave guide dimension. The length $l$ of the septum 15 is selected to be of sufficient electrical length to provide the 180° phase shift, as noted above.

Figs. 1b and 1c represent the relative orientations of the electric fields of the waves in the normal and slow-speed wave guides 21, 23 at points intermediate the input and output ends thereof, as for example, at the lines $b$—$b$ and $c$—$c$, respectively. As shown, the direction of the electric field in the upper guide 21, is invariant, as at 53 and 55, while the direction of the electric field in the lower guide 23 assumes progressively increasing angles therewith, as at 57 and 59.

In the operation of the converter, a wave in the $TE_{0,1}$ mode, entering section 11 is divided by the branched wave guides 21, 23 into two equi-phase and equi-magnitude components. One component, that in the wave guide 21, is transmitted with substantially no alteration in phase, while the other, that in the wave guide 23, experiences a phase shift of 180°, whereby at the junction of the rectangular guides 21, 23 and the circular guide 29, two anti-phase waves are derived which snap off or launch a circularly symmetric $TM_{0,1}$ wave in the cylindrical guide 29.

Figs. 2 and 3 illustrate an arrangement for converting waves in the $TE_{0,1}$ mode in a rectangular guide to the $TM_{0,1}$ mode in a circular guide using a phase-velocity-increasing section in place of the phase-velocity-decreasing section hereinabove described. Certain parts of this arrangement are similar to corresponding parts of the apparatus of Fig. 1 and are, therefore, identified in the following description by the same reference characters. Thus, waves in the $TE_{0,1}$ mode in the rectangular wave guide 11 are divided into equi-phase and equi-magnitude components upon entering a pair of branched wave guides 61, 63 formed by a conductive septum 65 disposed parallel to the wide transverse dimension of the guide 11 and midway between the relatively wide walls thereof.

The wave guide section 61 has a wide dimension equal to that of the guide 11, while the wave guide 63 is formed with a constricted or relatively reduced wide dimension, whereby the phase velocity and the wavelength, in the guide, of the waves therein are increased with respect to the corresponding quantities of the waves in the wave guide 61. This alteration of the phase velocity of the waves, as described above, causes a shift in the phase of the sped-up wave with respect to the unaffected wave, as shown by the graphic representations of Figs. 2a through 2d.

Thus, the phase of the wave in the guide 61 is invariant throughout the length of the guide, as indicated by the vectors 67, while the phase of the waves in the constricted guide 63 is rotated from the symmetrical sense illustrated at 69, in Fig. 2a, through the intermediate states 71, 73 of Figs. 2b and 2c, to the anti-parallel sense indicated at 75 in Fig. 2d. The two anti-phase waves thus derived launch the circularly symmetric wave of the desired $TM_{0,1}$ mode in a cylindrical guide 77 connected to the guide sections 61, 63.

Fig. 4 illustrates a further modified form of mode converter constructed in accordance with the principles of my invention. As shown, the converter comprises a pair of adjacent rectangular wave guides 79, 81 having similar transverse dimensions and sharing a common wall 83 in the wide dimension thereof. The wave guide section 81, at one end, is non-reflectively terminated, as at 85, at a point spaced from the input of wave guide 79, and extends coterminously in the opposite direction with wave guide 79 to a point at which a cylindrical wave guide 86 is adjoined in the manner described hereinabove in connection with the guide sections 11 and 29 of Fig. 1.

An iris 87 is formed in the common wall 83 and preferably extends across the wall 83. The width $w$ of the iris 87 is dimensioned to divide the wave energy in the wave guide 79 into equal portions of opposite phase, one portion being propagated in the upper guide 80 and the other in the lower guide 81.

Fig. 4a graphically represents the phases of the $TE_{0,1}$ wave in the wave guide section 79 at the transverse plane through $a$—$a$, the vector 89 being perpendicular to the wide transverse dimension of the guide. Fig. 4b graphically represents the relative phases in the transverse plane through $b$—$b$ of Fig. 4, the vector 91 showing the unaltered phase of the waves in the guide portion above the common wall 83 and the vector 93 representing the anti-parallel phase of the waves in the guide portion below the common wall 83.

The anti-phased waves are propagated in the respective upper and lower wave guide portions and, at the termination of the common wall portion 83 and the junction with circular guide 86, launch the desired circularly symmetric $TM_{0,1}$ mode.

There has thus been described various forms of straight-through wave guide mode converters for converting a $TE_{0,1}$ mode in a rectangular wave guide into a $TM_{0,1}$ mode in a circular wave guide which obviate the above-described disadvantages of the prior-known types of converters utilizing bends to accomplish such conversion.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. Mode conversion apparatus comprising a first section of rectangular wave guide defining a propagation path for ultra high frequency energy in a $TE_{0,1}$ mode, a second section of rectangular wave guide having a wide wall portion in common with a wide wall portion of said first section, means defining an opening in said common wall portion for launching a portion of the energy from said first section into said second section of wave guide, said opening being dimensioned to shift the phase of the energy propagated along said second section substantially 180 electrical degrees at the operating frequency of the ultra high frequency energy relative to the portion of the energy propagated in said first section, and circular wave guide means coupled to said first and second sections as a straight through extension thereof for recombining the relatively phase shifted energy in said sections into a $TM_{0,1}$ mode.

2. In combination, a first section of rectangular wave guide, a second section of rectangular wave guide adjacent said first section of guide and having a wide wall portion in common with a wide wall portion of said first section, said sections adapted to propagate applied waves in a $TE_{0,1}$ mode along their length, means for coupling a portion of the waves being propagated in one of said sections to the other section for propagation by said other section, means for shifting the phase of the waves propagated along one of said sections relative to that propagated along the other section by 180 electrical degrees at the operating frequency of said waves, and a circular wave guide coupled to both said guides as a straight through extension thereof for recombining the relatively phase shifted waves propagated along said sections into a $TM_{0,1}$ mode.

3. Mode conversion apparatus comprising a first section of rectangular wave guide defining a propagation path for electromagnetic energy in a $TE_{0,1}$ mode, a second section of rectangular wave guide having a wide wall portion in common with a wide wall portion of said first section, means defining an opening in said common wall portion for launching a portion of the energy from said first section into said second section of wave guide, said opening being dimensioned to shift the phase of the energy propagated along said second section substantially 180 electrical degrees at the operating frequency of said energy relative to the portion of the energy propagated in said first section, and a circular wave guide means coupled to said first and second sections as a straight through extension thereof for recombining the relatively phase shifted energy in said sections into a $TM_{0,1}$ mode.

4. Mode conversion apparatus comprising a first section of rectangular wave guide defining a propagation path for electromagnetic energy in a first mode, a second section of rectangular wave guide having a wide wall portion in common with a wide wall portion of said first section, means defining an opening in said common wall portion for launching a portion of the energy from said first section into said second section of wave guide, said opening being dimensioned to shift the phase of the energy propagated along said second section substantially 180 electrical degrees at the operating frequency of said energy relative to the portion of the energy propagated in said first section, and a circular wave guide means coupled to said first and second sections as a straight through extension thereof for recombining the relatively phase shifted energy in said sections into a second mode.

5. Mode conversion apparatus comprising a first section of rectangular wave guide defining a propagation path for electromagnetic energy in a first mode, a second section of rectangular wave guide having a wide wall portion in common with a wide wall portion of said first section, means defining an opening in said common wall portion for launching a portion of the energy from said first section into said second section of wave guide, said opening being dimensioned to shift the phase of the energy propagated along said second section at the operating frequency of said energy relative to the portion of the energy propagated in said first section, and a circular wave guide means coupled to said first and second sections as a straight through extension thereof for recombining the relatively phase shifted energy in said sections into a second mode.

6. In combination, a first section of rectangular wave guide, a second section of rectangular wave guide having its wide wall portion in common with the wide wall portion of said first section, said sections adapted to propagate applied waves in a $TE_{0,1}$ mode along their length, means for shifting the phase of the waves propagated along said first section relative to that propagated along said second section by substantially 180 degrees at the operating frequency of said waves, a circular wave guide having an end wall with an aperture therein, means for launching the energy propagated by said first and second sections directly through said aperture for combination in a $TM_{0,1}$ mode in said circular wave guide comprising conductive means coupling said first and second section directly to said end wall.

7. In combination, a first section of a rectangular waveguide, a second section of rectangular waveguide adjacent said first section of guide and having a wide wall portion in common with a wide wall portion of said first section, said sections adapted to propagate applied waves in a first mode along their length, means for coupling a portion of the waves being propagated in one of said sections to the other section for propagation by said other section and for shifting the phase of the waves propagated along one of said sections relative to that propagated along the other section by 180 electrical degrees at the operating frequency of said waves, and a circular waveguide coupled to both said guides for recombining the relatively phase shifted waves propagated along said sections into a second mode.

References Cited in the file of this patent

UNITED STATES PATENTS

| 2,129,669 | Bowen | Sept. 13, 1938 |
| 2,618,744 | Braden | Nov. 18, 1952 |

OTHER REFERENCES

Ragan: Microwave Transmission Circuits, M. I. T. Rad. Lab. Series, vol. 9, published 1948, McGraw-Hill, pages 364–367 relied on. (Copy in Patent Office Library.)